US011068238B2

(12) United States Patent
Kennedy et al.

(10) Patent No.: US 11,068,238 B2
(45) Date of Patent: Jul. 20, 2021

(54) MULTIPLIER CIRCUIT

(71) Applicant: Arm Limited, Cambridge (GB)

(72) Inventors: Michael Alexander Kennedy, Cambridge (GB); Neil Burgess, Cardiff (GB); Zichao Xie, Cambourne (GB); Chiloda Ashan Senarath Pathirane, Cambourne (GB)

(73) Assignee: Arm Limited, Cambridge (GB)

( * ) Notice: Subject to any disclaimer, the term of this patent is extended or adjusted under 35 U.S.C. 154(b) by 246 days.

(21) Appl. No.: 16/417,866

(22) Filed: May 21, 2019

(65) Prior Publication Data
US 2020/0371749 A1 Nov. 26, 2020

(51) Int. Cl.
*G06F 7/53* (2006.01)
*G06F 7/509* (2006.01)

(52) U.S. Cl.
CPC ............ *G06F 7/5312* (2013.01); *G06F 7/509* (2013.01)

(58) Field of Classification Search
CPC ..................... G06F 7/523–5312; G06F 7/5324
See application file for complete search history.

(56) References Cited

U.S. PATENT DOCUMENTS

| | | | | | |
|---|---|---|---|---|---|
| 4,887,232 A | * | 12/1989 | Wolrich | ................ | G06F 7/4876 708/505 |
| 5,257,217 A | * | 10/1993 | Chiu | ..................... | G06F 7/5324 708/629 |
| 2004/0179681 A1 | * | 9/2004 | Lee | .......................... | G06F 7/728 380/30 |
| 2006/0069710 A1 | * | 3/2006 | Har | ......................... | G06F 7/728 708/491 |
| 2006/0184604 A1 | * | 8/2006 | Takeuchi | ............ | G06F 7/49921 708/620 |

* cited by examiner

*Primary Examiner* — Matthew D Sandifer
(74) *Attorney, Agent, or Firm* — Nixon & Vanderhye P.C.

(57) ABSTRACT

A multiplier circuit is described in which sub-products calculated in a first stage of a carry-save adder (CSA) network are output early, processed by applying a processing function, and re-injected into a subsequent stage of the CSA network to add the processed sub-products. This allows a CSA network provided for multiplication operations to be reused for operations which require sub-products to be processed and added, such as floating-point dot product operations performed on floating-point values represented in bfloat16 format.

20 Claims, 8 Drawing Sheets

MULTIPLIER CIRCUIT

BACKGROUND

Technical Field

The present technique relates to a multiplier circuit.

Technical Background

A processor may have logic circuitry for implementing various arithmetic or logical operations. One arithmetic operation to be supported by a processor may be a multiplication operation. Multiplications are common in a range of processing algorithms, e.g. digital signal processing, and so the performance achieved by the multiplier circuit of a typical CPU may be an important factor in the overall performance of the processor.

SUMMARY

At least some examples provide a multiplier circuit comprising: a carry-save adder (CSA) network comprising a plurality of carry-save adders to perform partial product additions to reduce a plurality of partial products to a redundant result value represented using a carry-save representation, the CSA network comprising: a first stage of carry-save adders to perform a first subset of the partial product additions using selected portions of the partial products to generate a plurality of sub-products; and at least one further stage of carry-save adders to perform a further subset of the partial product additions using the plurality of sub-products generated by the first stage and remaining portions of the partial products, to generate the redundant result value; sub-product processing circuitry to apply a processing function to the plurality of sub-products generated by the first stage of carry-save adders, to generate processed sub-products represented using the carry-save representation, said processing function comprising at least one operation other than addition; and input control circuitry to inject the processed sub-products as inputs to a subset of carry-save adders of said at least one further stage, to provide a sum-of-processed-sub-products mode in which the redundant result value generated by said at least one further stage represents a sum of the processed sub-products generated by the sub-product processing circuitry.

At least some examples provide a data processing apparatus comprising the multiplier circuit discussed above.

At least some examples provide a multiplier circuit comprising: means for carry-save adding, comprising a plurality of carry-save adders to perform partial product additions to reduce a plurality of partial products to a redundant result value represented using a carry-save representation, the means for carry-save adding comprising: a first stage of carry-save adders to perform a first subset of the partial product additions using selected portions of the partial products to generate a plurality of sub-products; and at least one further stage of carry-save adders to perform a further subset of the partial product additions using the plurality of sub-products generated by the first stage and remaining portions of the partial products, to generate the redundant result value; means for applying a processing function to the plurality of sub-products generated by the first stage of carry-save adders, to generate processed sub-products represented using the carry-save representation, said processing function comprising at least one operation other than addition; and means for injecting the processed sub-products as inputs to a subset of carry-save adders of said at least one further stage, to provide a sum-of-processed-sub-products mode in which the redundant result value generated by said at least one further stage represents a sum of the processed sub-products generated by said means for applying the processing function.

At least some examples provide a method for a multiplier circuit comprising a carry-save adder (CSA) network comprising a plurality of carry-save adders to perform partial product additions to reduce a plurality of partial products to a redundant result value represented using a carry-save representation, the CSA network comprising: a first stage of carry-save adders to perform a first subset of the partial product additions using selected portions of the partial products to generate a plurality of sub-products; and at least one further stage of carry-save adders to perform a further subset of the partial product additions using the plurality of sub-products generated by the first stage and remaining portions of the partial products, to generate the redundant result value; the method comprising: controlling the first stage of carry-save adders to perform the first subset of the partial product additions; controlling sub-product processing circuitry to apply a processing function to the plurality of sub-products generated by the first stage of carry-save adders, to generate processed sub-products represented using the carry-save representation, said processing function comprising at least one operation other than addition; and injecting the processed sub-products as inputs to a subset of carry-save adders of said at least one further stage, to provide a sum-of-processed-sub-products mode in which the redundant result value generated by said at least one further stage represents a sum of the processed sub-products generated by the sub-product processing circuitry.

Further aspects, features and advantages of the present technique will be apparent from the following description of examples, which is to be read in conjunction with the accompanying drawings.

DESCRIPTION OF EXAMPLES

Figure 1:
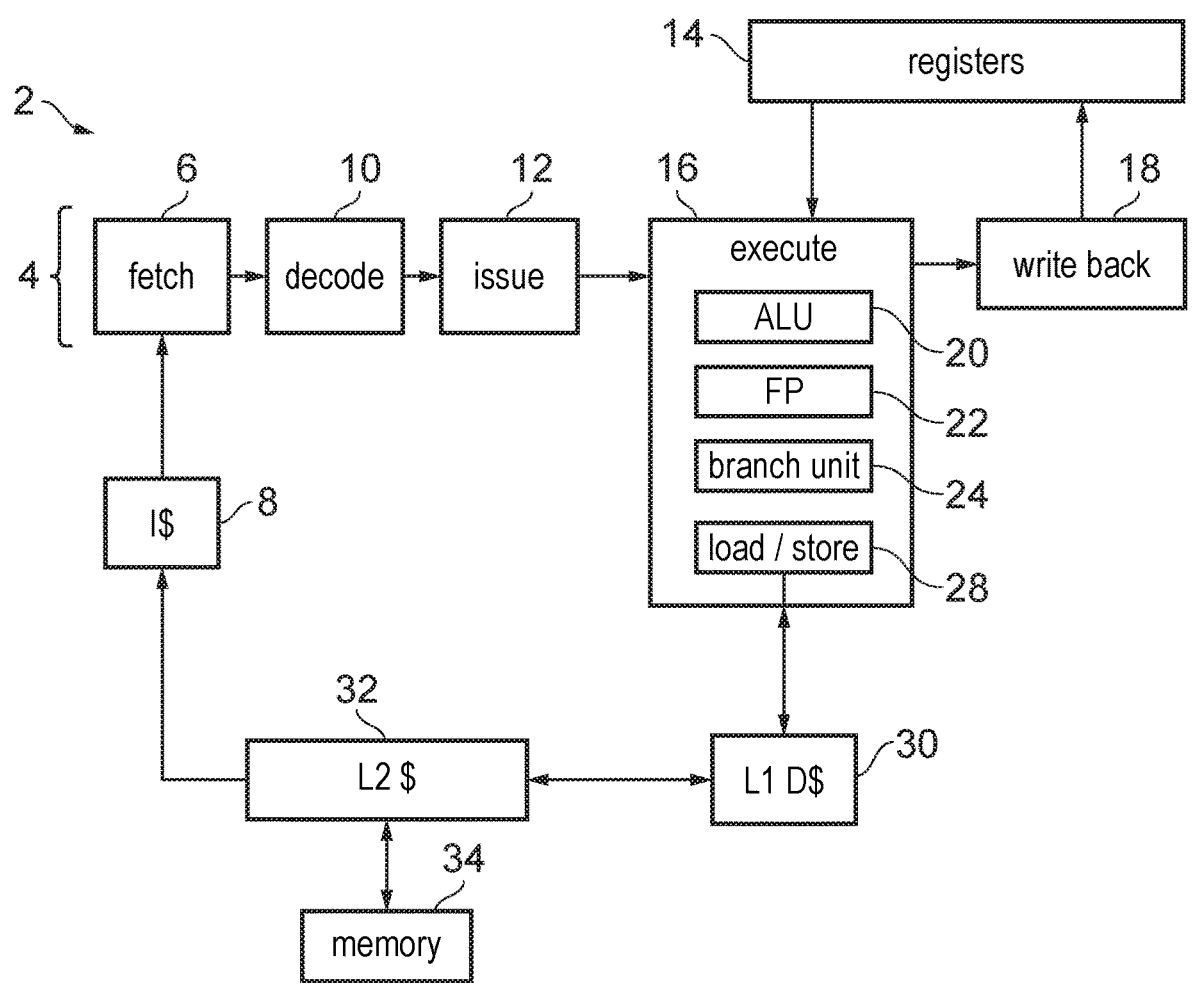
FIG. 1 schematically illustrates an example of a data processing apparatus.

A multiplier circuit may include a carry-save adder (CSA) network which includes a number of carry-save adders (CSAs) for performing partial product additions to reduce a number of partial products to a redundant result value represented using a carry-save representation. Multiplication of two operands can generally be performed by adding a number of partial products, with the partial products selected based on the operands being multiplied. It is common to use a network of CSAs to perform the partial product additions, because CSAs are faster than carry-propagate adders (CPAs) which generate a non-redundant result by adding a carry bit generated at one bit position into the sum being performed at the next bit position. For a CPA, the overall delay scales with the total number of bits in the values being added, because the sum at one bit position cannot be performed until the sum at the previous bit position has generated its carry (although carry lookahead schemes are possible to accelerate a CPA, this adds extra complexity and is limited in the total bitwidth for which it is feasible to perform a carry lookahead). In contrast, with CSA as the carries are separately represented in a carry term, separate from the sum term, and so additions of multiple bits can be performed in parallel. Although eventually the redundant result value may need to be converted into a non-redundant result by adding the carry and save terms using a CPA, this is typically only needed for the final step of the multiplication and the preceding additions of partial products can be done faster using the CSA network than with CPAs.

In general, a CSA network may be provided to support multiplications of operands having some defined maximum size, for example to support M×N-bit multiplications of M-bit and N-bit operands respectively, where M may equal N or be different to N. Hence, the CSA network may comprise a sufficient number of CSAs to be able to perform the full partial product additions required for calculating a redundant result value which represents the product of the M-bit and N-bit operands.

However, sometimes it may be desirable to perform operations which require calculation of sub-products of smaller portions within the operands. For example, some SIMD (single instruction multiple data) operations may require independent calculation of products of selected data elements within the operands provided to the multiplier. It is possible to calculate such independent sub-products within the same CSA network provided for handling multiplications over larger operand sizes, by controlling the generation of partial products and the locations at which carries are propagated between columns/rows of the CSA network.

However, there may also be some operations for which the generated sub-products may need to be processed using a processing function which may include at least one operation other than addition, and so such a processing function may not be possible to perform within the CSA network itself. One way of handling such operations may be to provide two or more separate CSA networks, each for generating one of the sub-products, and then to provide some further logic to receive the generated sub-products from each of the CSA networks, process each sub-product using the processing function, and then add the processed sub-products together. However, this approach may require a large amount of additional circuit area if such an operation is to be performed within a reasonable latency.

This problem can be addressed in the techniques discussed below, by instead reusing part of the carry-save adder network to perform addition of the processed sub-products.

In the examples discussed below, the CSA network includes a first stage of carry-save adders to perform a first subset of the partial product additions using selected portions of the partial products to generate a number of sub-products, and at least one further stage of carry-save adders to perform a further subset of the partial product additions using the sub-products generated by the first stage and remaining portions of the partial products, to generate the redundant result value. The first stage and at least one further stage of CSAs can be used for a standard multiplication to generate the redundant result value corresponding to the product of certain input operands. However, the CSA network may be ordered so that the sub-products which may be required for a sum-of-processed sub-products (SPSP) operation are available by the end of the first CSA stage. Note that the first CSA stage may in some examples also perform additional partial product additions which are not required for generating the sub-products required for the SPSP operation, but could also perform some additional additions which may be used in a regular multiplication, in parallel with those additions for generating the sub-products.

The multiplier circuit has sub-product processing circuitry to apply a processing function to the sub-products generated by the first stage of CSAs, to generate processed sub-products represented using the carry-save representation, where this processing function includes at least one operation other than addition. Input control circuitry may inject the processed sub-products as inputs to a subset of carry-save adders of the at least one further stage, to provide a sum-of-processed-sub-products (SPSP) mode in which the redundant result value generated by the at least one further stage represents the sum of the processed sub-products generated by the sub-products processing circuitry.

Hence, with this approach the order in which the additions within the CSA network are performed for a regular multiplication are arranged so as to prioritise early return of the sub-products needed for the SPSP mode, and then the sub-product processing circuitry can apply the processing function to those sub-products and then have the results of that processing function reinjected back into the CSA network at a certain subset of carry-save adders within the at least one further stage of carry-save adders of the CSA network. Hence, this reuses the existing adder circuits of the CSA network (which are used for standard multiplication operations in a multiplication mode) to add the processed sub-products in the SPSP mode, to reduce the amount of additional hardware required to support the SPSP mode, compared to the CSA network already provided for multiplications. This helps reduce overall circuit area and power consumption.

The input control circuitry may control which inputs are provided to the subset of carry-save adders of the at least one further stage of the CSA network, based on whether the multiplier circuit is functioning in a multiplication mode or the SPSP mode. In the SPSP mode, the processed sub-products generated by the sub-product processing circuitry are injected as the input to the subset of CSAs in the at least one further stage. In the multiplication mode, the inputs to this subset of CSAs depend on at least one of: the sub-products generated by the first stage of carry-save adders, results of earlier CSAs of the at least one further stage, and/or remaining portions of the partial products.

Hence, the same hardware circuits of this subset of carry-save adders in the at least one further CSA stage may be used both for the further subset of partial product additions for generating a result value in the multiplication mode, and for the addition of the processed sub-products in the SPSP mode. By reusing existing hardware already provided for multiplications to add the processed sub-products, this reduces the amount of circuit area required for supporting both types of operation.

Similarly, within the first stage of CSAs in the CSA network, the same hardware adders may be used both for generating the plurality of sub-products in the SPSP mode, and for performing corresponding additions for reducing partial products in the multiplication mode, as part of performing the full set of partial product additions required for performing the multiplication according to the multiplication mode. Hence, both the generation of the sub-products and the adding of the processed sub-products for the SPSP mode can be performed using existing adders within the CSA network used for the multiplication mode, to reduce overall hardware costs.

The at least one further stage of CSAs may comprise second and third stages of CSAs respectively to perform second and third subsets of the partial product additions. In the multiplication mode, the third stage may perform the third subset of partial product additions depending on results of the second subset of partial product additions performed by the second stage. The subset of CSAs, for which the input control circuitry may inject the processed sub-products as inputs when in the SPSP mode, may be CSAs within the third stage of CSAs, rather than in the second stage. Hence, the processing path taken by the generated sub-products from the first stage of CSAs through the sub-product processing circuitry may bypass the second stage of CSAs and the results of the processed sub-products may be reinjected into the third stage of CSAs.

This approach is useful because it means that the latency associated with the processing of the sub-products by the sub-product processing circuitry can be performed in the shadow of partial product additions performed by the second stage of CSAs for a regular multiplication in the multiplication mode. That is, the second stage of CSAs may perform the second subset of partial product additions in parallel with the sub-product processing circuitry applying the processing function to the plurality of sub-products generated by the first stage of CSAs. Although in practice the multiplication mode may not use the result of performing the processing function on the sub-products, and the SPSP mode may not use the result of the second stage of carry-save adders, by performing these operations in parallel this means that whichever mode is selected, the latency taken to reach the third stage of CSAs can be substantially the same and the third stage of CSAs may have sufficient rows of carry-save adders to be able to add the processed sub-products if the SPSP mode has been selected. With this approach, the re-entrance of the processed sub-products into the CSA network can be performed with little effect on the critical path through the CSA network for regular multiplications, and there is no need to delay the second subset of partial product additions while performing the processing of the sub-products using the sub-product processing circuitry. The additional delay on the critical path for the multiplication mode may simply be a delay associated with a multiplexer for selecting the input to the subset of CSAs in the third stage, which may be a relatively low latency cost compared to the latency of the processing function applied to the sub-products by the sub-product processing circuitry.

The at least one further stage of CSAs (including second and third stages as discussed above) may comprise a number of lanes of carry-save adders, where each lane is used to generate bit values for a corresponding part of the redundant result value. The addition of the processed sub-products in the SPSP mode may not require the full bitwidth provided by all of the lanes of carry-save adders. In some cases it may be sufficient to use only a subset of these lanes for adding the processed sub-products. Although it may be possible to use any arbitrary selection of a contiguous block of lanes of the further stage of carry-save adders to perform the addition of the processed sub-products, the total delay associated with the SPSP operation can be reduced by selecting, as the subset of carry-save adders which are to be provided with the inputs based on the processed sub-products, those adders which are provided in a most significant subset of the lanes. This most significant subset of lanes excludes at least one lane of carry-save adders for generating a least significant part of the redundant result value. Although the delay within the CSA network itself may be the same regardless of which block of adjacent lanes is used to add the processed sub-products, often the multiplier circuit may also include a carry-propagate adder (CPA) for adding a sum term and a carry term of the redundant result value to generate a non-redundant result value represented in a non-redundant representation. The CPA may propagate carries from the least significant end of the result to the most significant end, and so the delay associated with determining the most significant bits may depend on the total number of bits over which the carry-propagate addition is being performed. By excluding carry-save adders within the least significant lane of the further stage of the CSA network from the addition of the processed sub-products, this means that the carry propagation within the CPA can start at a more significant bit, as it is not necessary to consider any sums or carries within a lower portion of the results, and so this can make it faster for carries to ripple up to the most significant bit of the non-redundant results. Hence, using a most significant subset of lanes within the CSA network for adding the processed sub-products can reduce processing delay in the subsequent carry-propagate adder, so that the non-redundant result value can be determined quicker.

The multiplier circuit may include partial product generating circuitry to generate the partial products based on a first operand and a second operand. Each of the sub-products used for the SPSP mode may correspond to the product of a respective pair of selected portions of the first and second operands. For example one of the sub-products may correspond to the product of a first selected portion of the first operand and a corresponding first selected portion of the second operand and another sub-product may correspond to the product of a second selected portion of the first operand and a corresponding second selected portion of the second operand.

The processing function which is applied to the sub-product generated by the first stage of CSAs could be any processing function which includes at least one step other than an addition.

However, one particular example for which the technique discussed in this application is useful is where the processing function includes an alignment shift to align the sub-products.

More particularly, this technique can be useful in cases where the alignment is based on a shift amount which is calculated based on further portions of the first and second operands, which are different portions of the first/second operands to the selected portions used to generate the sub-products themselves. Hence the sub-product processing circuitry may comprise shift amount calculating circuitry to calculate a shift amount based on these further portions of the first and second operands, and shift circuitry to shift a given sub-product of the two or more sub-products generated by the first CSA stage by a number of bit positions which depends on the shift amount calculated by the shift amount calculating circuitry.

Such an alignment shift can be useful in cases where the first/second operands supplied to the partial product generating circuitry each represent two or more floating-point values represented in a floating-point representation. Each floating-point value may have an exponent and a fraction. The selected portions of the first and second operands used to generate the sub-products may be those portions which represent the fractions of the floating-point values, while the further portions which are used to generate the shift amount may be those portions of the first and second operands which represent the exponents of the floating-point values. This approach can be useful for calculating sums of products of floating-point values, where the exponents of those floating-point values are used to calculate the alignment shift between the sub-products which allows bits of the sub-products of equivalent significance (magnitude) to be added together to perform a sum-of-products result.

Although this technique could be applied to floating-point values represented in any floating-point representation, it can be particularly useful for truncated-precision floating-point representations. The IEEE 754 Standard may define full-precision floating-point representations, such as single-precision or double-precision floating-point, each defined with a certain number of exponent bits and a certain number of fraction bits (double-precision floating-point representation provides a greater number of exponent bits and a greater number of fraction bits than single-precision). However, it is also possible to provide a truncated-precision floating-point representation which has the same number of exponent bits as a corresponding full-precision floating-point representation, but which has a smaller number of fraction bits than the full-precision floating-point representation. An example of such a truncated-precision floating-point representation is the bfloat16 representation which has the same number of exponent bits as the single-precision floating-point representation but a smaller number of fraction bits than the single-precision format. For bfloat16, the size of the exponent may be similar to the size of the fraction and so it may be attractive to pack a number of truncated-precision floating-point values into a vector of elements, as both the fraction and the exponent may have a number of bits approximately equivalent to a certain data element size (e.g. 8 bits). With such packed floating-point values in the truncated-precision representation, by extracting the elements which represent the fractions and using these to form the partial products, this allows unrounded sub-products each corresponding to the product of a pair of fractions of floating-point values to be calculated within the first stage of the CSA network, and the elements which represent the exponents can be used by the sub-product processing circuitry to determine the size of the shift amount needed for aligning the unrounded sub-products, and after shifting by the determined shift amount the aligned processed sub-products can be injected back into the third stage of the CSA network for adding the processed sub-products so that the redundant result value generated by the end of the CSA network represents the sum of the aligned sub-products of respective pairs of floating-point values in the truncated format. Hence, a multiplier circuit can be provided in which, in addition to standard multiplications supporting multiplications of integers across a certain maximum operand size, can also perform bfloat16 dot product operations. This provides a very efficient way of designing multiplier support for floating-point sum of product operations.

The shift amount calculated by the shift amount calculating circuitry may depend on additions or subtractions of the further portions of the first and second operands. To determine the shift amount, this may require a carry propagate adder to identify a non-redundant representation of the result of these additions and subtractions. Hence, the CPA for determining the shift amount may introduce a certain amount of delay. One approach could be to wait until the full shift amount is available before performing any shifting of the sub-product, but this may introduce additional delay.

This approach can be avoided by performing the shift in a number of shift stages. Hence the shift circuitry may include two or more shift stages including at least a first shift stage which performs a stage one shift operation on a given sub-product depending on a least significant portion of the shift amount calculated by the shift amount calculating circuitry, and a second shift stage which performs a stage two shift operation on the given sub-product or on a result of the first shift stage, depending on a more significant portion of the shift amount calculated by the shift amount calculating circuitry. The first shift stage may perform its stage one shift operation in parallel with the shift amount calculating circuitry calculating the more significant portion of the shift amount. Hence, the latency required for calculating higher bits of the shift amount can be hidden by performing this calculation in parallel with a shift based on lower bits of the shift amount, to reduce the overall latency of shifting.

When aligning two sub-products, the shift will typically only need to be applied to one of those sub-products, but which sub-product is the one to be shifted will depend on the relative magnitude represented by the respective sub-products. The shift amount calculating circuitry, which adds or subtracts various further portions of the operands representing the exponents of the floating-point values, may determine the relative magnitude of the respective sub-products based on the sign of the shift amount calculated. The sign may depend on the most significant portion of the shift amount, but this most significant portion may be the slowest part of the shift amount to calculate as it is not known until carries have rippled all the way up from the lower end of the shift amount up to the most significant bit. Hence, waiting until the most significant portion of the shift amount is ready before determining whether to apply a shift to a given sub-product can be slow.

This can be addressed by having the shift amount calculating circuitry calculate the most significant portion of the shift amount in parallel with the shift circuitry performing the shift on the given sub-product based on at least one less significant portion of the shift amount. Having already performed the shift based on less significant portion(s) of the shift amount, the sub-product processing circuitry may select, based on the most significant portion of the shift amount, whether to cancel the shift performed on the given sub-product by the shift circuitry. In cases where the shift applied is a right shift, the shift may be cancelled if the shift amount indicates that the sub-product that was shifted was the larger of the sub-products being aligned. In implementations which perform the alignment shift using a left shift, the shift may be cancelled if the shift amount indicates that the sub-product that was shifted is the smaller of the sub-products being aligned. Either way, if the most significant portion of the shift amount indicates that the given sub-product did not need to be shifted, then the shift can be cancelled. While it may seem inefficient to perform a shift and then cancel it, in practice this means that in the event that the shift is required, the shift result is available faster than if the sub-product processing circuitry waited until it could be determined whether the shift is required before starting the shift. This helps to reduce the latency of the processing of the sub-products, to improve performance in the SPSP mode. This also makes it more efficient to integrated support for the SPSP mode into the CSA network already provided for multiplication mode, as it makes it more likely that the processed sub-products can be obtained sufficiently fast enough to allow re-entry into the CSA network without increasing the critical path latency for the multiplication mode.

In some examples, in the multiplication mode, the only multiplication supported may be a full multiplication across the full operand width of the first and second operands which are used to select the partial products.

However, in other implementations the multiplication mode may also support SIMD operations where the redundant result value is generated comprising one or more result elements, with each result element representing a product of a respective pair of elements of the first and second operands. The data element size may be variable so that the multiplier can be configurable to support SIMD multiplications on operands comprising two or more elements each. SIMD control circuitry may be provided to control, based on a selected data element size of each element of the first and second operands, whether to zero certain portions of the partial products, and whether to propagate carries between respective carry save adders of the CSA network at certain locations within the network. The locations at which the partial product bits are set to zero or at which the carries are halted may depend on the particular data element size selected. A configurable SIMD multiplier may be adapted to support the SPSP mode as discussed above. SIMD control circuitry provided for controlling locations of carries and partial product zeroing for the SIMD operations can be reused to control the zeroing of partial product inputs and locations at which carries are performed between CSAs to isolate the sub-products in the output of the first CSA stage when using the SPSP mode.

The multiplier circuit may be incorporated into a data processing apparatus which includes the multiplier as part of an arithmetic/logic unit for performing arithmetic or logical operations on operands read from registers. An instruction decoder may decode program instructions to generate control signals to control processing circuitry to perform the processing operation represented by the decoded program instruction. In response to certain types of program instruction, such control signals may control the multiplier circuit to perform an operation. In response to a multiply instruction, the instruction decoder may generate control signals to control the input control circuitry of the multiplier circuit to operate in the multiplication mode. In response to a sum-of-processed-sub-products (SPSP) instruction, the instruction decoder may generate control signals to control the input control circuitry to operate in the SPSP mode. Hence, the same multiplier circuit can be configured by the instruction decoder for different operations, with sharing of hardware between those operations.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
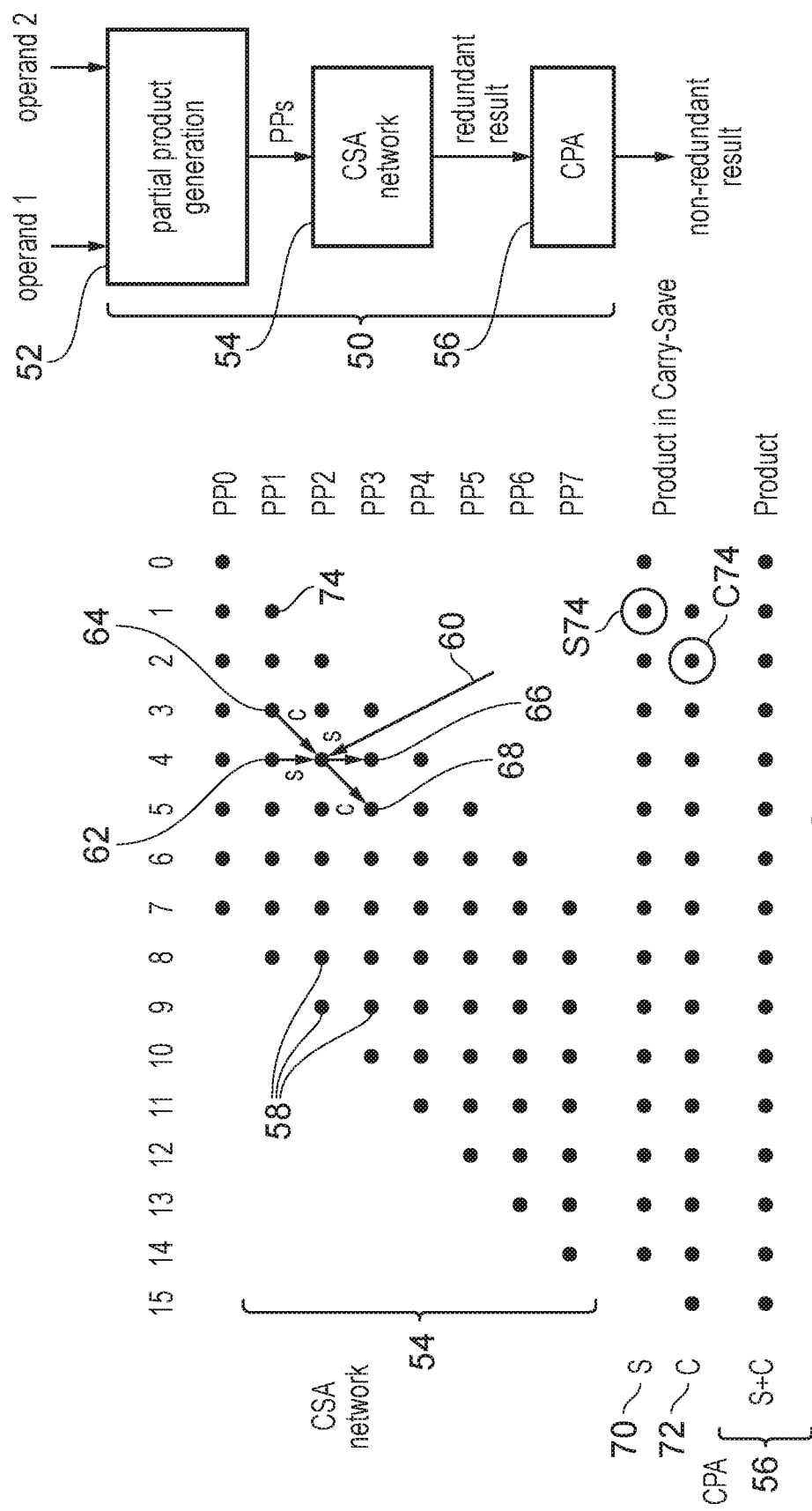
FIG. 2 shows an example of a multiplier circuit.

One example of an operation which may be supported by the ALU 20 is a multiplication operation. FIG. 2 illustrates an example of a multiplier circuit 50 which can be included within the execute stage 16 of the processor 2. The right hand part of FIG. 2 shows the components of the multiplier circuit 50 while the left hand part of FIG. 2 shows a dot diagram for explaining the functionality of the multiplier circuit. As shown in the right hand part of FIG. 2, the multiplier circuit 50 has partial product generating circuitry 52 for generating a number of partial products (PPs) based on first and second operands supplied as the inputs to the multiplication. For example, each partial product may correspond to a selected multiple of one operand, where each multiple is selected based on a portion of bits of the other operand. For example, a Booth encoding scheme may be used to select the partial products based on the input operands.

The multiplier 50 also includes a carry-save-adder (CSA) network 54, which comprises a number of inter-connected carry-save adders (CSAs) which perform partial product additions to reduce the partial products generated by the partial product generating circuitry 52 to a redundant result value which is represented in carry-save representation using separate sum and carry terms. The multiplier 50 also includes a carry propagate adder 56 which adds the sum and carry terms of the redundant product value to produce a non redundant result.

The dot diagram in the left hand part of FIG. 2 explains the function of the multiplier circuit, in this example, for a radix-2 8-bit unsigned multiplication. It will be appreciated that other examples could be provided with different operand width or different radix. Each row of the dot diagram labelled PP0 to PP7 represents one of the partial products generated by the partial product generation circuitry 52. Each dot of a given partial product PP represents one bit of that partial product, and the dots are aligned in columns based on the respective significance of each partial product in comparison to the end result. For example, in this example, each successive partial product may have its most significant bit one bit position to the left of the most significant bit of the preceding partial product. If radix-4 Booth encoding is used for the partial products, the offset in significance between successive partial products would be 2 bits.

The CSA network 54 adds together the partial products, considering the relative offsets in magnitude. Each column of dots shown in FIG. 2 represents bit values which are added together to produce a corresponding bit in the final product. However, each addition (other than the first row of additions) also considers a carry generated in the previous row at a lower bit position.

In the first row of dots corresponding to partial product PP0, the respective bit values of PP0 are simply provided as inputs to the carry save adders in the next row, as there is no addition to be performed in the first row, but for each subsequent row of dots each dot corresponds to one carry save adder (CSA). Each CSA 58 reduces three inputs to two outputs. The three input bits are: a corresponding bit of one of the partial products PP0-PP7, a sum bit calculated by the CSA in the same column of a preceding row, and a carry bit calculated by the CSA in the next column on the right within the preceding row. For CSAs in any row other than the final row, the two output bits for a given CSA are: a sum bit provided to the CSA in the next row of the same column, and a carry bit provided to the CSA in the next column on the left within the next row. For the final row, the output sum and carry bits become corresponding bits within the sum and carry terms of the redundant result value represented in carry-save form. For example, for a particular CSA labelled 60 in FIG. 2, this CSA is at a bit position which corresponds to the third least significant bit of partial product PP2. CSA 60 adds the third least significant bit of PP2 to a sum bit produced by CSA 62 and a carry bit produced by CSA 64 as labelled in FIG. 2. The sum bit generated by CSA 60 from the sum of the three input bits is output to CSA 66 in the next row within the same column, and the carry bit produced by CSA 60 is supplied to the CSA 68 in the next column of the next row. While FIG. 2 shows one example of ordering the partial product additions for adding the partial products, it will be appreciated that the order in which these additions are performed need not be from top-to-bottom as shown in FIG. 2. As addition is an associative operation, it would be possible to perform later rows of addition shown in FIG. 2 first, and then include the carries generated in those additions to the additions associated with earlier rows. Hence, there is freedom to reorder the sequence in which the additions are performed.

By using a network 54 of carry save adders, the cost of adding the partial products is lower than if carry propagate adders had been used for the additions. Higher radix Booth (e.g. Radix-4 or Radix-8) encoding of the partial products can be used to reduce the number of rows if desired to improve performance.

The sum bits produced by the final CSA within each column form a sum term 70, and the carry bits produced by the final CSA within each column form a carry term 72. The sum term 70 and carry term 72 together represent a redundant result in carry-save representation. FIG. 2 shows the carry term 72 offset by one bit relative to the sum term 70, to align the carry and sum bits which represent values of equal significance. For example, the bit of the sum term 70 within column 1 is produced based on the sum bit produced by CSA 74 within column 1 and the bit of the carry term labelled C74 within column 2 is produced by the carry bit produced by the CSA 74 within column 1. The sum and carry terms 70, 72 of the redundant result are added using the carry propagate adder 56 to generate a non-redundant product result. The CPA performs a sequential series of additions, each addition adding the carry bit from one column to the sum bit from the next column to the left and the carry generated in the addition in the preceding column, so that any resulting carries are rippled up towards the most significant end of the product result. The result is a binary value in two's complement form, which represents the product of the two input operands in a non-redundant representation.

Figure 3:
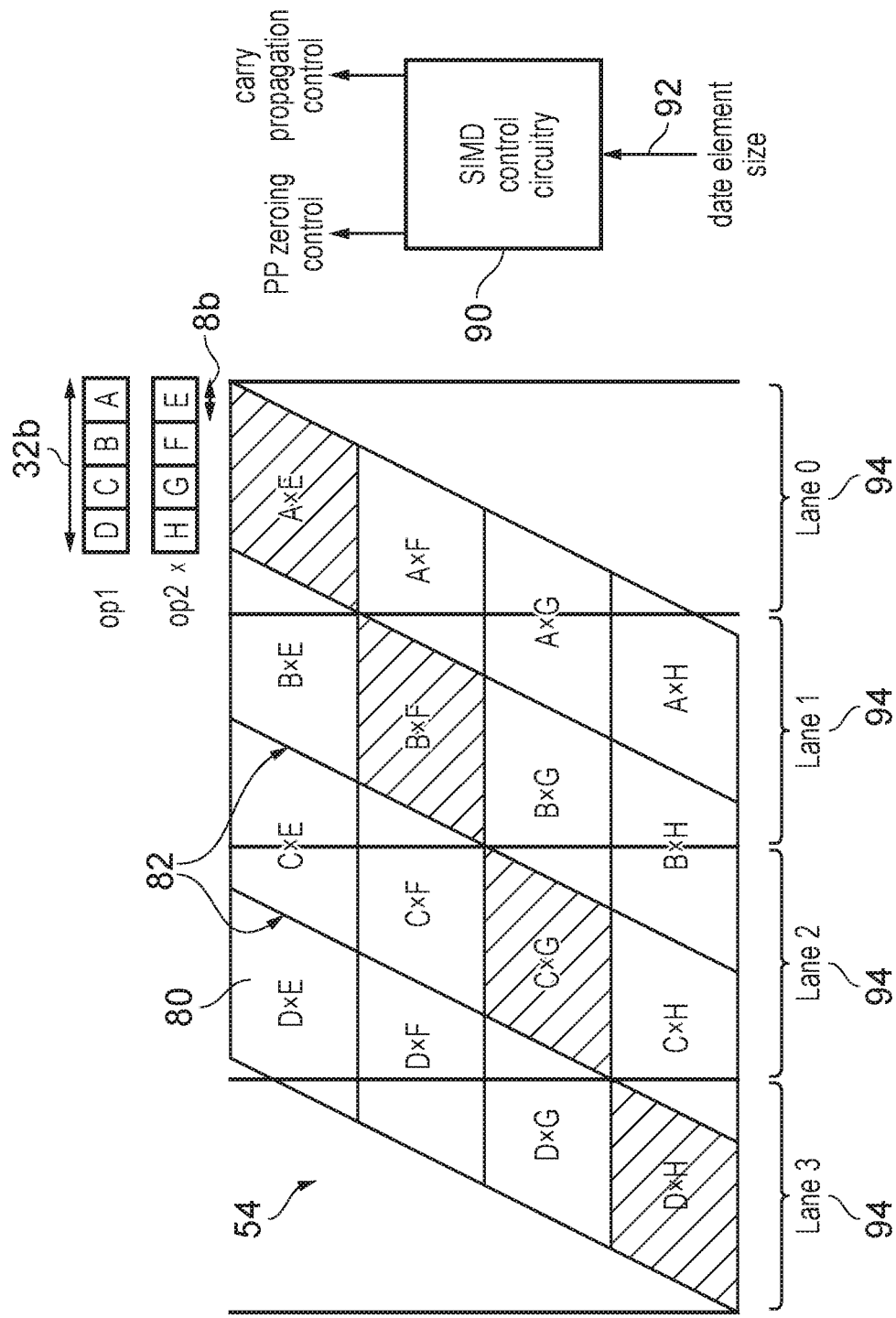
FIG. 3 shows how the multiplier circuit can be configurable for single instruction multiple data (SIMD) operations.

FIG. 3 shows how a multiplier circuit 50, which supports multiplications of operands having a given maximum operand size, can be configurable to support SIMD operations where the operands are sub-divided into smaller elements and the result comprises a number of sub-product elements each corresponding to the product of a respective pair of elements of the input operands. In the example of FIG. 3, the multiplier is a 32-bit multiplier, which is also configurable to handle separate 8×8-bit multiplications. When performing multiplications across the full 32-bit operand size, the multiplier may function in a similar way to the 8-bit example of FIG. 2, but with additional rows and columns of CSAs to support a 32×32-bit multiplication. For conciseness, in FIG. 3 the partial product generation circuitry 52 and CPA 56 are not illustrated, and the diagram just shows the CSA network 54. The 32-bit operands can be subdivided into 8-bit elements, labelled A-D in operand 1 and E-H in operand 2. The CSA network 54 can be sub-divided into 16 portions (sixteenths), each comprising a group of CSAs. For a given sixteenth of the network, if all sum and carry inputs from CSAs in other sixteenths were set to zero, so that the only non-zero inputs to the given sixteenth would be a subset of bits of the partial products, then the output of the given sixteenth would represent, in carry-save form, the sub-product of a particular 8-bit element of the first operand with a particular 8-bit element of the second operand. For example, the sixteenth labelled 80 in FIG. 3 would provide sum and carry terms representing the sub-product of element D of operand 1 and element E of operand 2, and similarly the other sixteenths of the network would each calculate sub-products of other pairs of elements C×E, B×E, A×E, D×F, etc.

When a full 32-bit multiplication is being performed, then at the boundaries 82 between these sixteenths sum and carry bits may propagate between sixteenths, so that in practice the output of a given sixteenth may not represent the sub-product of the corresponding elements exactly, as bits calculated in other sixteenths may be added to the sub-product calculated in the given sixteenth. With a full 32-bit multiplication, only the 8×8-bit sub-product at the top right sixteenth of the CSA network could be recognisable from the output of that sixteenth, as other sixteenths would receive at least one sum or carry bit from another sixteenth.

However, SIMD (single instruction multiple data) control circuitry 90 may be provided to select, based on a current data element size 92, which portions of the partial products should be zeroed by the partial product generation circuitry 52, and which locations within the CSA network 54 should have their carries suppressed from propagating to the next column, so that it is possible to isolate the sub-products calculated by different sixteenths of the CSA network. For example, when the selected data element size is 8 bits, then at each of the boundaries 82 between respective sixteenths of network, carries may be suppressed to prevent a carry to the right of the boundary being added to bits calculated to the left of the boundary. Also, when an 8×8-bit bit multiplication is being performed on respective pairs of 8-bit elements at corresponding bit positions within the operands 1 and 2, then the only parts of the CSA network which need to perform their sums are the sixteenths shown shaded in FIG. 3 which calculate the respective sub-products A×E, B×F, C×G and D×H respectively. The unused sixteenths of the CSA network, which are shown unshaded, would in a full multiplication be used to calculate sub-products of elements at different element positions within the two operands, but these are not needed for the 8×8-bit element multiplication. Hence, the partial product bits which would normally be input into these unused parts of the CSA network for a full multiplication can be set to 0 when performing the reduced 8 by 8 bit multiplication. This will mean that within the final product, each lane 94 of the result may be formed only based on the partial product editions performed within the shaded sixteenths of the network and the unshaded parts will have no effect as their inputs were set to 0 and carries prevented from propagating to the shaded parts of the CSA network 54. The adders in unused sixteenths of the network 54 propagate any sum bits passed to them directly through to the next row.

In this way, the multiplier can be configurable to produce independent sub-product elements within the redundant result. In a similar way to the control over the propagation of carries within the CSA network 54, the CPA 56 may also have carry propagation supressed at element boundaries, so that the non-redundant result also comprises independent elements each representing a sub-product of two 8-bit elements.

While FIG. 3 shows an 8×8-bit example, the configurable SIMD multiplier could also perform independent 16×16-bit multiplications. In this case, the network 54 would be divided into quarters (each comprising 4 of the sixteenths shown in FIG. 3) by suppressing carries at the boundaries between quarters, using two of the quarters to calculate the sub-products between the 16-bit elements, and zeroing of partial product bits for the other two unused quarters of the network.

Hence, the multiplier circuit 50 may be a SIMD multiplier which is configurable to support integer multiplication across a range of data element sizes within the CSA network 54.

As well as integer operations, the execute stage 16 may also support floating-point operations. While FIG. 1 shows the integer ALU 20 and floating-point unit 22 as separate execution units, some floating-point operations performed by the floating-point unit 22 could re-use some of the hardware provided within the ALU for integer operations. One operation which could benefit from such sharing of hardware may be a dot product operation performed on unrounded floating-point values represented in a bfloat16 format, which could re-use some of the hardware already provided in the configurable multiplier of FIG. 3 for integer SIMD operations.

Figure 4:
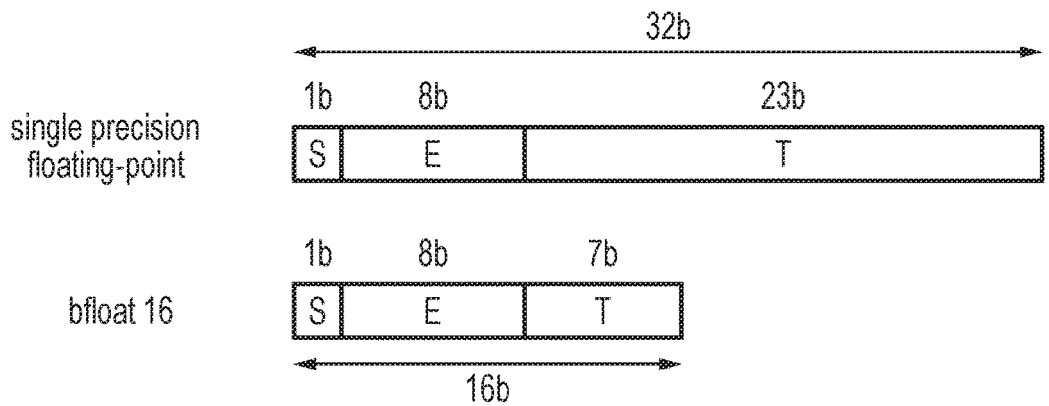
FIG. 4 illustrates an example of full-precision and truncated-precision floating-point representations.

FIG. 4 shows a comparison between different floating-point representations. A floating-point value is formed of a number of components, including a sign bit S indicating whether the value is positive or negative, a fraction (or significand) H.T and an exponent E indicating a power of two by which the fraction is to be multiplied to give the numeric value represented by the floating-point value.

The fraction is formed of a hidden bit H (or implicit bit) and trailing bits T, where the hidden bit H is not represented in the stored representation of the floating-point number, but is implicit and is appended by the circuitry when processing the floating-point values, and the trailing bits T are stored as part of the stored representation of the floating-point number.

For normal non-zero floating-point values, the hidden bit H=1, and so the stored representation of the floating-point number is expanded by appending an implicit bit of 1 to the most significant end of the trailing bits T of the fraction. For normal non-zero floating-point inputs, the numeric value of the floating-point number is equivalent to $\pm 1.T*2^{E-bias}$, where T is the trailing bits of the fraction, E is the exponent and "bias" is a fixed exponent bias amount specified for a particular floating-point format (e.g. the bias is 127 for single precision floating-point and bfloat16). The bias is used to allow a continuous sequence of unsigned exponent values from 0 to the maximum positive value of E to represent both negative and positive powers of 2, which allows for simpler hardware logic than if a signed representation of E was used.

For floating-point values representing zero or a subnormal value, the hidden bit H=0. Zero is signalled by setting the exponent E to 0 and setting all the trailing bits T of the fraction to 0, so that the fraction is 0.0.

Subnormal floating-point values are signalled by setting the exponent E to 0 and having a non-zero fraction with at least one of the trailing bits T set to 1. For subnormal values, the hidden bit H=0, and the numeric value of the floating-point number is equivalent to $\pm 0.T*2^{-bias+1}$. Note that for some processor implementations, rather than handling subnormal values accurately in hardware, it may be preferred to simply treat subnormal floating-point values as zero (this can be referred to as "flush to zero" (FZ) subnormal handling behaviour).

The IEEE 754 standard defines various formats of floating-point value including half precision, single precision and double precision, which have different numbers of bits for the exponent and fraction respectively. The bfloat16 format is a truncated version of the single precision floating-point format, in that it has the same number of exponent bits (8 bits) as the single precision format, but has a smaller number of fraction bits than single precision (bfloat16 uses 7 bits for the trailing bits T of the fraction, while single precision format has 23 trailing bits T). The bfloat16 format is useful in applications such as machine learning and artificial intelligence, where often the order of magnitude of a numeric value is more important than precision in the exact numeric value. For such applications, reduced precision in the fraction H.T of the floating-point value may be acceptable, and by reducing the number of bits in the fraction this can enable the floating-point number to be represented in half the bits, allowing reduced storage requirements for storing a block of floating-point numbers.

Hence, the bfloat16 format is an example of a truncated floating-point format which has a shorter fraction H.T compared to a full-precision floating-point format (single-precision). While bfloat16 is a truncated version of the single precision floating-point format, it would also be possible to provide truncated versions of other full-precision floating-point formats (e.g. it would be possible to provide a bfloat32 format with a 11-bit exponent and 20 trailing bits T as a truncated version of double-precision floating-point representation which has a 11-bit exponent and 52 trailing bits T).

Figure 5:
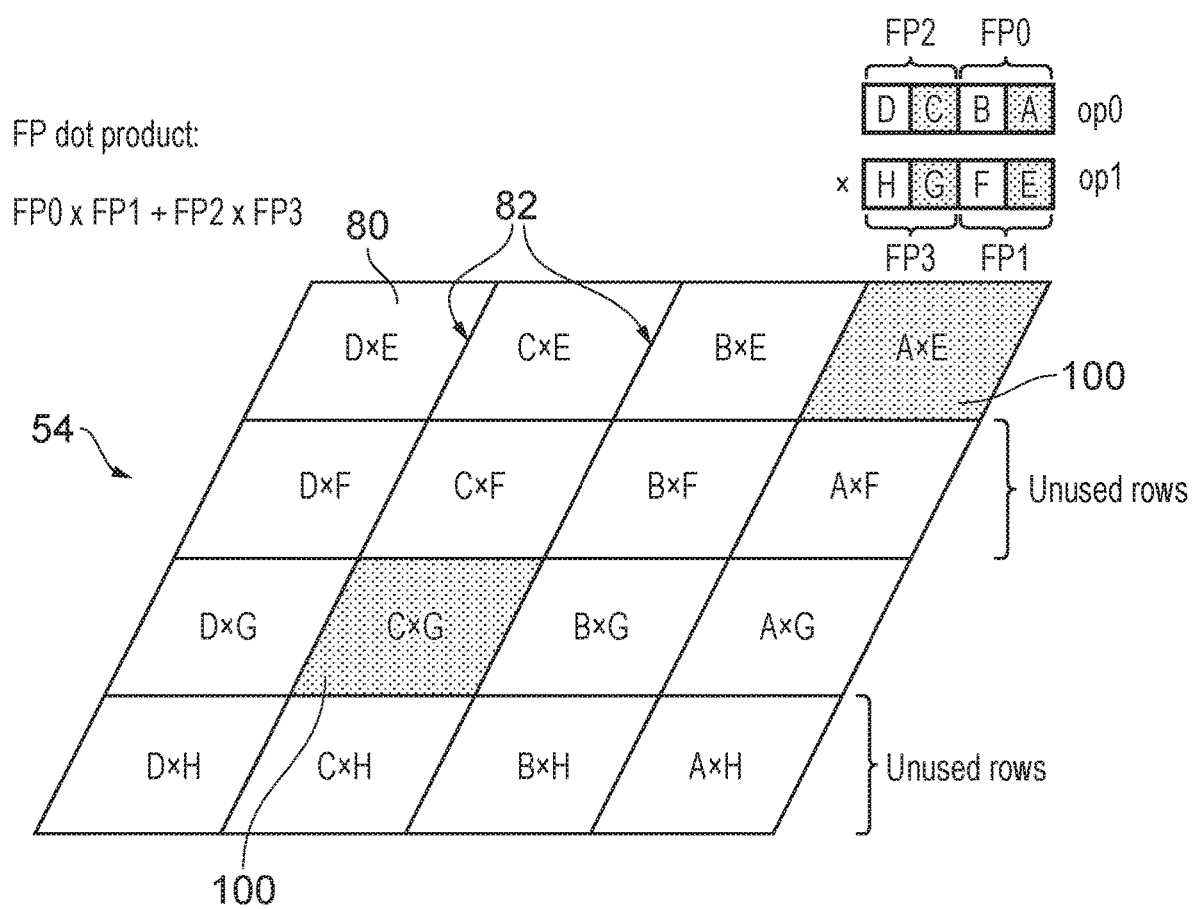
FIG. 5 shows an example of sub-products which may be calculated based on portions of input operands corresponding to the fractions of floating-point values represented in the truncated-precision floating-point format.

FIG. 5 shows an example of a dot product operation which may be performed on floating-point values. The dot product operation is an example of a sum-of-processed sub-products (SPSP) operation as discussed elsewhere in this application. The dot product operation may comprise calculating a number of respective sub-products of pairs of floating-point values and then adding the products together. In the example of FIG. 5 there are only two sub-products being added, but it would be possible to perform dot products where more than two sub-products of respective floating-point values are added together.

Hence in this example the dot product result corresponds to FP0×FP1+FP2×FP3. When the respective floating-point values are represented according to the bfloat16 format shown in FIG. 4, then the fractions and exponents of the respective floating-point values can be packed into 32-bit vector operands op0, op1 as shown in FIG. 5. For example the fractions could be packed into the shaded portions of the vector operands, and the exponents E stored in the unshaded portions. Hence, in this example the fractions for the respective floating-point values FP0 to FP3 are represented by elements A, E, C, G respectively, and the exponents E of the floating-point values FP0 to FP3 are represented by elements B, F, D, H respectively. In this case the respective sub-product calculations for calculating the fractional parts of the sub-products FP0×FP1 and FP2×FP3 can be performed within the configurable multiplier array shown in FIG. 3, using the shaded portions 100 of the CSA network 54 which perform the partial product additions corresponding to A×E and C×G respectively. Other portions of the CSA network 54 are not needed for calculating the sub-products, including a number of unused rows of carry-save adders. Hence, the CSA network 54 from the SIMD multiplier could be re-used to perform the sub-product calculations for a floating-point dot product operation.

However, with a typical CSA network, the addition of the respective sub-products together cannot be performed within the CSA network 54 itself, because when adding two floating-point values, it is necessary to align the values being added by applying an alignment shift to one of the operands based on a shift amount calculated from comparing the respective exponents of those operands. In the case of the dot product operation shown in FIG. 5, this alignment shift may be calculated based on the exponents in elements B, F, D, H of the input operands, with the shift distance calculated based on the difference between the combined exponents B+F of floating-point values 0 and 1 and the combined exponents D+H of the floating-point values FP2 and FP3. This alignment shift cannot be performed within the CSA network 54 itself and so would require some further processing.

Figure 6:
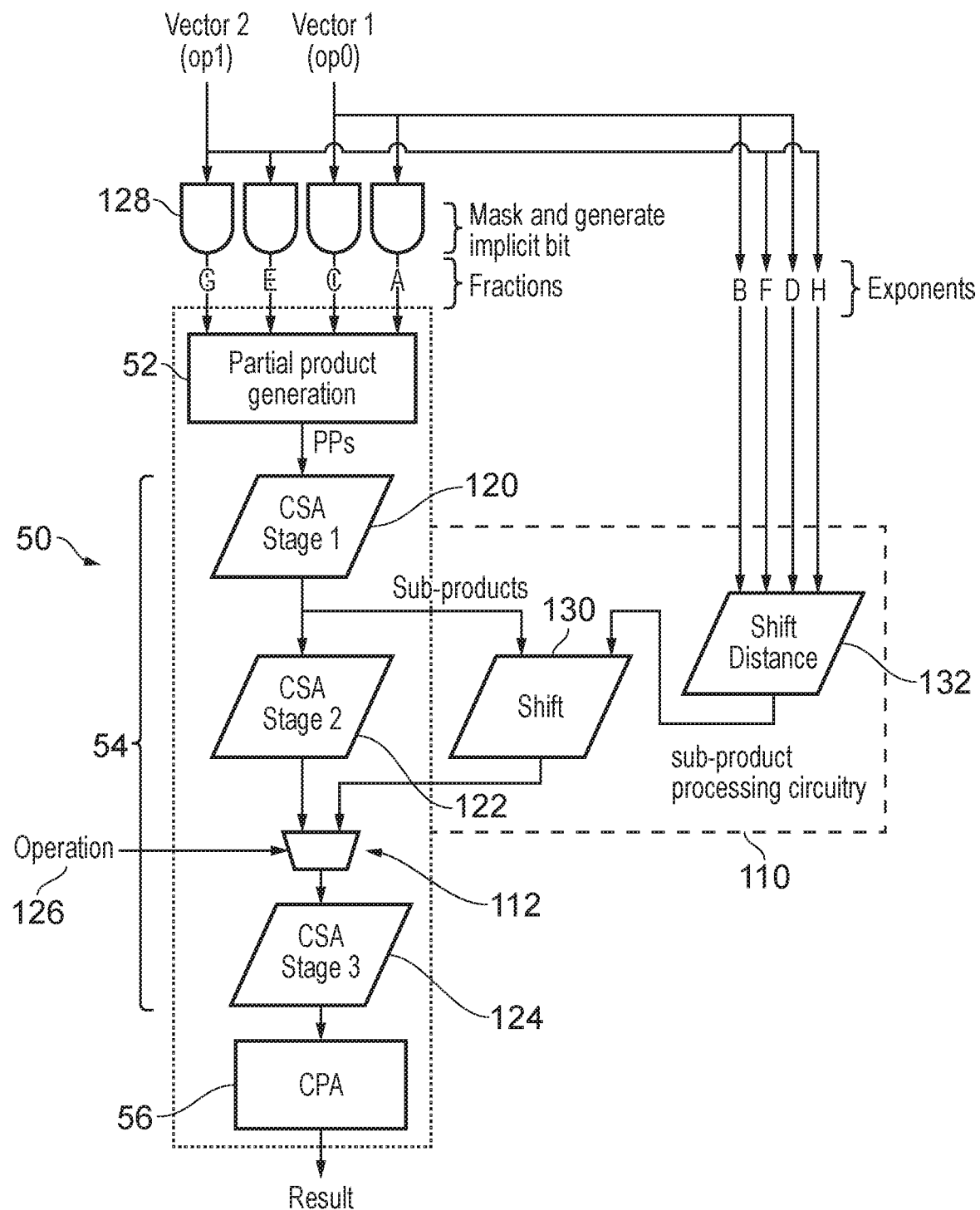
FIG. 6 shows an example of a multiplier circuit having a multiplication mode and a sum-of-processed-sub-products mode.

FIG. 6 shows an example of a multiplier circuit 50 in which the multiplier is adapted to support performing a sum-of-processed-sub-products (SPSP) operation, such as the floating-point dot product operation of FIG. 5, in addition to supporting standard multiplications of integer values (including SIMD multiplications). Hence, the multiplier circuit 50 of FIG. 6 has a multiplication mode for regular multiplications (including SIMD multiplications), and an SPSP mode for performing the SPSP operation. The mode to use for a given instruction is selected based on the instruction type identified by the instruction decoder 10. As in the example of FIG. 2, the multiplier 50 comprises partial product generation circuitry 52, a CSA network 54 and a carry propagate adder 56. However, the multiplier 50 of FIG. 6 also includes sub-product processing circuitry 110 and input control circuitry 112.

The CSA network 54 comprises a first CSA stage 120, a second CSA stage 122 and a third CSA stage 124. The second and third stages 122, 124 may together be considered to represent at least one further stage of carry save adding. The three CSA stages of the CSA network 54 as a whole comprise sufficient CSAs to perform a full multiplication across the full operand width, e.g. in the 32-bit example of FIG. 5, a full 32×32 bit multiplication. However, the order in which the respective additions of partial products are added is changed so that within the first stage 120, the additions performed at that stage are enough to calculate independent sub-products A×E and C×G for the highlighted regions 100 of the network shown in FIG. 5. The second and third CSA stages 122, 124 then include any remaining additions needed to produce the full multiplication result when performing a multiplication over the full operand width. It will be appreciated that while stage 120 performs at least those additions needed to calculate the highlighted sub-products A×E, C×G, it could also perform other additions of partial products which are not needed for generating the sub-products A×E, C×G. For example, stage 1 could include at least some other additions within the same row as the additions needed for the sub-products A×E, C×G.

The third CSA stage 124 includes at least a sufficient number of rows of CSAs that are required for adding the processed sub-products produced by the sub-product processing circuitry based on processing of the sub-products output by the first CSA stage 120. Any remaining rows which are used for a multiply operation, but are not needed for a SPSP operation, are provided within the second stage 122.

The sub-product processing circuitry 110 is used in an SPSP mode to perform an alignment shift on the respective sub-products output by the first CSA stage 120, with that alignment shift being based on a shift distance calculated based on the exponents taken from the elements B, F, D, H of the input vectors. The input selection circuitry 112 selects, as inputs to a certain subset of adders of the third CSA stage 124, either values from the second CSA stage 122 or the processed sub-products generated by the sub-product processing circuitry 110, depending on an operation type identifier 126 which is provided by the instruction decoder 10 based on the type of program instruction that was decoded. Hence, in response to decoding a multiply instruction, the input selection circuitry 112 (e.g. a multiplexer) could select the output of the second CSA stage 122, while in response to a sum-of-processed-sub-products (SPSP) instruction, such as an instruction for calculating floating-point dot products, the input selection circuitry 112 may select the processed sub-products from the sub-product processing circuitry 110. Regardless of which mode is selected, the third stage 124 of the CSA network 54 processes the selected inputs to perform further additions to produce the redundant result value which can then be subject to carry propagate addition of the sum and carry terms using the CPA 56 to generate the final result.

Hence, FIG. 6 shows a multiplier which combines data paths for multiplications and aligned sum-of-products operations. The vectors 1 and 2 are supplied as input to either the multiplication or the SPSP operation. For both the multiply mode and the SPSP mode, the input vectors are subject to masking using masking logic 128 which masks out fields from the operands that are not used for the operation, e.g. the floating-point exponent and sign fields, so that only the fractional bits are used.

Also, the masking logic 128 may generate the hidden bit of 1 to be appended at the most significant end of the fractions of each of the floating-point values. Note that while zero or subnormal inputs (which may be treated as zero) would actually require an implicit bit of 0, to simplify timing requirements the masking logic 128 may append an implicit 1 regardless, but correct for zero or subnormal inputs downstream. For a multiply operation, the multiply operation in a given lane of processing could proceed assuming an input value of 1.T instead of a zero or subnormal input, but the corresponding result element in the destination register can be forced to 0 for a lane which includes a zero or subnormal input, regardless of the output of the multiplier for that lane. For an SPSP operation, the sub-product processing circuitry 110 could force the aligned sub-product to 0 at the alignment shift stage, if it is detected that one of the corresponding input bfloat16 values is subnormal or represents zero. This approach of using an implicit bit of 1 regardless of whether the inputs are zero or subnormal means that the latency associated with the detection of zero or subnormal inputs can be hidden in the shadow of starting to perform the partial product generation or additions in the first CSA stage 120, as it is not necessary to know whether the input is zero or subnormal until later on in the operation. This can improve performance.

The masked fraction bits in elements A, C, E, G are supplied to the partial product generator 52 to generate partial products for the multiply operation or SPSP operation. The delay through the partial product generator may be equivalent to at least one level of full adder. The masking of elements B, F, D, H effectively ensures that some of the zeroing needed to isolate the sub-products A×E, C×G in the first CSA stage 120 is already done. However, for SPSP mode some additional zeroing may also be performed in the partial product generating stage 52 to ensure that any partial product bits corresponding to A×G and C×E are also zeroed.

Having generated the partial products, the first CSA stage 120 starts the reduction process to perform the partial products additions for reducing the partial products to carry-save result. The reduction scheme is designed to favour the reduction of the highlighted regions 100 corresponding to the sub-products A×G and C×E, which are output to shift circuitry 130 of the sub-product processing circuitry 110, and the reduced results of the first CSA stage 120 are also supplied to the second CSA stage 122 for further reduction.

The sub-product processing circuitry 110 aligns the carry-save form products A×E and C×G for summation. The sub-product processing circuitry 110 includes shift distance calculating circuitry 132 which calculates the amount of the shift to be applied based on the exponents in elements B, F, D, H, and shift circuitry 130 to perform the alignment shift based on the calculated shift amount. This will be described in more detail with respect to FIG. 8. Having shifted one of the sub-products to align it to the other, the processed sub-products are supplied to the input selection circuitry. Meanwhile the second CSA stage 122 continues to reduce the partial products until at least four remain, which is the path taken by a normal multiplication in the multiplication mode. The outputs of the second CSA stage 122 are also provided to the input selection circuitry 112. The input selection circuitry 112 comprises a multiplexer which selects, based on the operation type 126, whether to output the outcome of the second CSA stage 122 or the aligned outputs from the sub-product processing circuitry 110, and outputs the selected values to the third CSA stage which then reduces the partial products to a redundant result in carry-save representation, which can then be added using the final CPA 56 to produce the final result.

Hence, by taking the sub-products from the first stage, processing them using the sub-product processing circuitry 110 and then re-injecting them into the third CSA stage 124 of the CSA network 54, this means that existing adder hardware already provided for multiplications can be re-used to add their respective aligned sub-products in the floating-point dot product operation, to avoid needing additional hardware for this operation, and this saves circuit area and power consumption.

Figure 7:
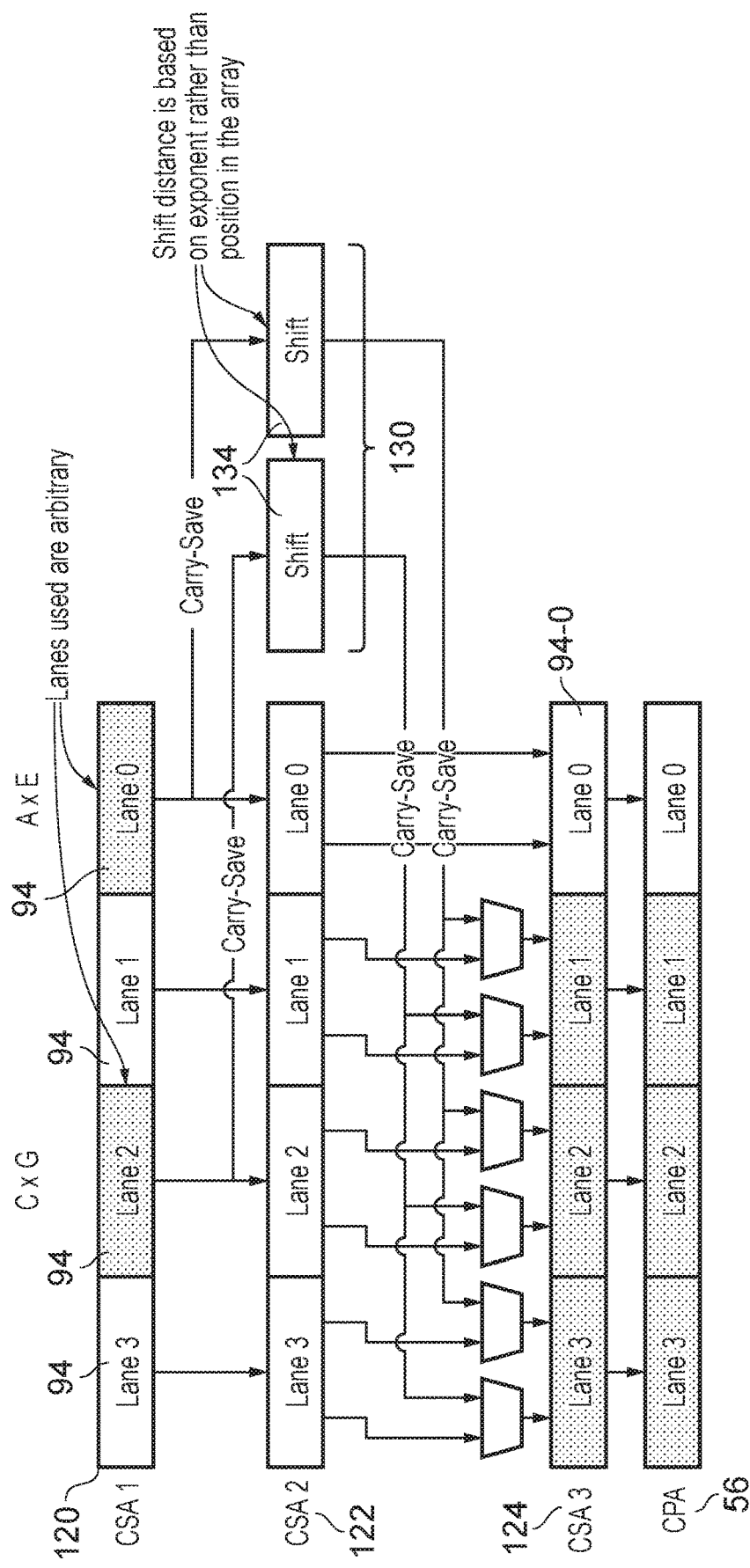
FIG. 7 shows how a number of most significant lanes of carry-save adders in a third stage of the carry-save adder network are used to add the processed sub-products generated by sub-product processing circuitry.

FIG. 7 shows in more detail the usage of lanes of carry save adders within the CSA network 54. As shown earlier in FIG. 3, the CSA network can be considered to be divided into lanes which correspond to respective portions of the redundant result generated by the CSA network. The sub-product calculations for the highlighted regions 100 of FIG. 5 only require the adders within two of the lanes. Which particular lanes are used for performing the additions of the highlighted regions 100 is an arbitrary design decision. While in the examples shown in FIGS. 5 and 7, the elements used to represent fractions of the floating-point values are in the positions A, C, E, G, and so the sub-product calculations are performed within lanes 0 and 2 of the first stage 120 of the CSA network 54, this is an arbitrary decision and it would also be possible to map the fractions of the floating-point values to different element positions. For example, if the fractions of floating-point values FP0 to FP3 has been mapped to elements A, B, E, F of the respective operands then the CSA network 54 could be modified to prioritise the calculation of the sub-products A×E and B×F within the first CSA stage 120, instead of A×E and C×G, and in this case it would be lanes 0 and 1 of the first CSA stage 120 that would be used to calculate the sub-products.

Whichever lanes are used to calculate the sub-products, in the SPSP mode these are output to the sub-product processing circuitry from the end of the first CSA stage 120. The shift circuitry 130 comprises two shift units 134, one for each of the sub-products A×E, C×G, for selectively performing a shift of that sub-product based on a shift distance calculated from the exponent elements. The shift control will be such that, for any given operation, one of the shift units 134 will perform a shift and the other will not perform its shift. If the shifts are implemented as right shifts, then the one of the shift units 134 that is processing the sub-product which has the lower combined order of magnitude as indicated by the sum of the corresponding exponents will have the shift applied and the shift unit 134 processing the larger of the sub-products will cancel its shift. It would be possible to implement the shift as a left shift instead, and in this case the shift would be applied to the larger of the sub-products.

Once the alignment shift has been performed then the aligned sub-products are then input back into the third CSA stage 124. As shown in FIG. 7, the addition of the aligned sub-products may not need adders in all of the lanes 94 of the third CSA stage 124. For example in the case of a 32-bit multiplier where the floating-point values are in the bfloat16 format, it may be sufficient to use three of the four lanes 94 of the third CSA stage 124. While bfloat16 dot product results may produce a 16-bit result, it can be useful to use the upper 3 lanes to give enough precision for avoiding introducing rounding errors when aligning the products, to allow an implementation where the 16-bit result is expanded to a FP32 output, and where possible to reuse output logic used for FP32/single precision multiplication.

Figure 8:
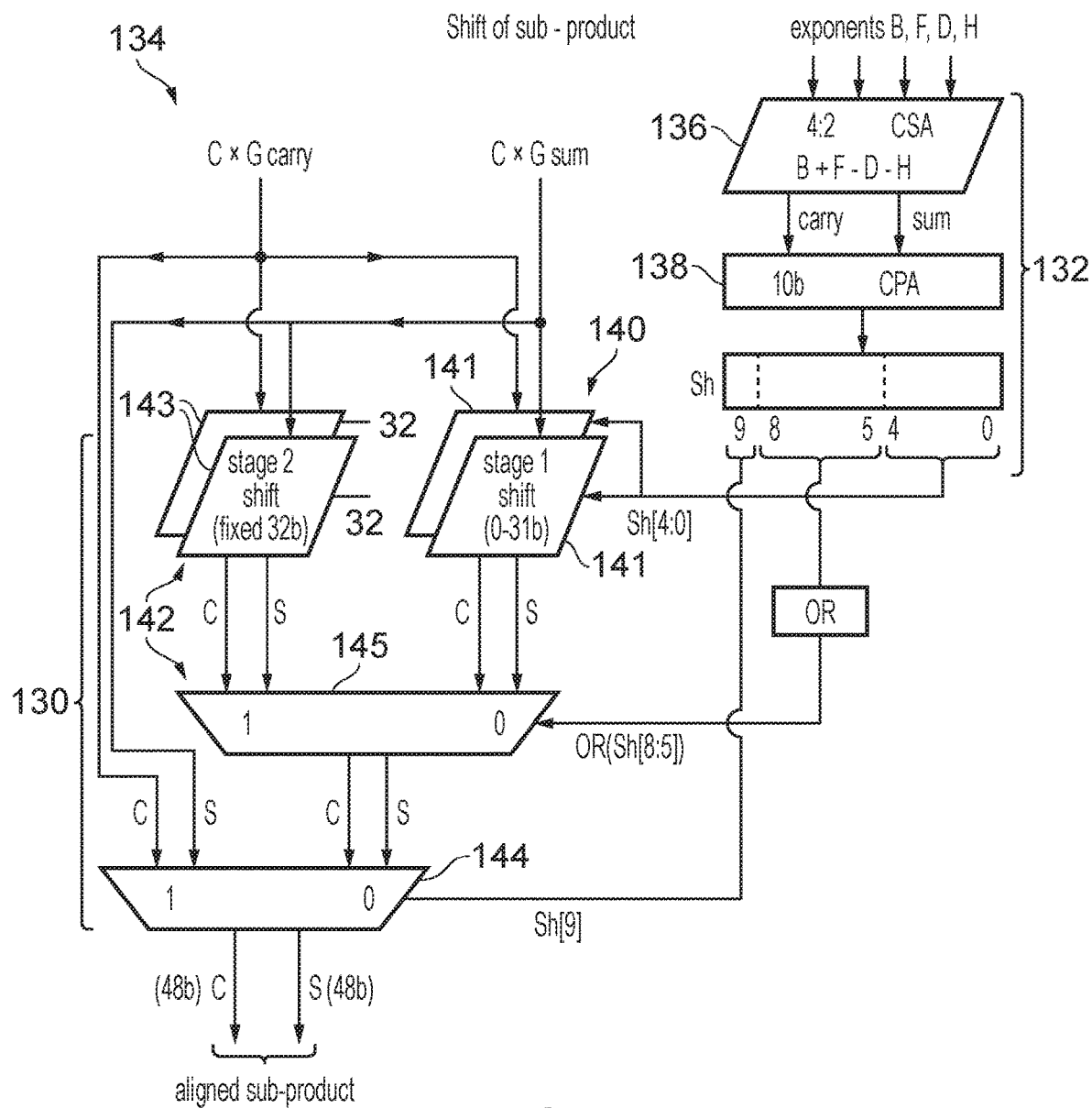
FIG. 8 shows the sub-product processing circuitry in more detail.

FIG. 8 shows an example of the shift unit 134 provided for aligning one of the two sub-products output by the first CSA stage. Both the shift circuitry 130 and the shift distance calculating circuitry 132 is duplicated per shift unit 134, one for each sub-product. For conciseness FIG. 8 only shows the shift unit 134 for processing one of the sub-products, in this example the sub-product C×G, but it will be appreciated that a corresponding shift unit 134 is also provided for the other sub-product.

The shift amount calculating circuitry 132 calculates a shift amount Sh based on the difference between the sum of the exponents of the other sub-product and the sum of the exponents of the current sub-product being shifted. For example when calculating the shift amount to be applied to sub-product C×G, the exponent difference is calculated according to:

$$\text{exponent difference} = \text{exponent of } A \times E - \text{exponent of } C \times G$$
$$= (B + F - 2^*\text{bias}) - (D + H - 2^*\text{bias})$$
$$= B + F - D - H.$$

This exponent difference calculation can be performed using a 4:2 carry-save adder 136 and a 10-bit carry-propagate adder 138, to generate a 10-bit shift amount Sh. As the shift amount is calculated using a carry-propagate adder 138, the lower bits of the shift amount will be available before the upper bits, as respective carries are rippled through each successive bit position up towards the most significant end of the shift amount. To allow part of the shift amount to be used before the upper end has been calculated, the shift circuitry 130 is divided into a number of stages to reduce the overall delay of shifting. The shift circuitry 130 includes a first shift stage 140, a second shift stage 142 and a third stage 144.

The first shift stage 140 comprises a pair of right shifters 141 which right shift the sum and carry terms of the sub-product C×G respectively, with both shifters 141 shifting the corresponding term by a shift distance (number of bit positions) indicated by the lower 5 bits of shift amount Sh (Sh[4:0]). Hence, the first stage shift is by a shift distance of between 0 and 31 bits, as selected based on the addition/subtraction of exponents. The first shift stage 140 operates in parallel with the shift amount calculating circuitry 132 calculating the upper bits Sh[9:5] of the shift amount, so that the latency of performing this shift can be hidden in the shadow of the calculation of the remaining bits of the shift amount.

The second shift stage 142 comprises a pair of right shifters 143 for applying a fixed right shift of 31 bits to the respective sum and carry terms of the sub-product C×G, and a multiplexer 145 which selects, based on an OR reduction of bits Sh[8:5] of the shift amount, whether to output either the shifted sum and carry terms produced by the stage one shifters 141 or the 31-bit shifted version of the original sum/carry terms produced by the shifters 143 of the second stage 142. The stage two shifters 143 can operate in parallel with the stage one shifters 141 or could even start performing the stage two shift before stage one is performed, as the stage two shifters 143 do not need to wait for any computation of any bits of the shift amount, but merely need the original sub-product C×G to be available. The multiplexer 145 is controlled based on an OR reduction of bits [8:5] of the shift amount, which means that if any of bits [8:5] of the shift amount is 1, then the 31-bit shifted sum and carry terms produced by the stage two shifter 143 will be selected by the multiplexer 145 and output to stage 344. If all of bits 5 to 8 Sh are 0, then the shift result from stage one shifters 141 is selected by the multiplexer 145.

The second shift stage 142 accounts for the fact that if the difference between the exponents of the respective sub-products is large enough that at least one of bits [8:5] of the shift amount is 1, then this means that the difference in magnitudes between the respective sub-products is so large that the smaller of the two sub-products would effectively have to be shifted out so far that when it is added to the larger of the two sub-products. For additions, this means that when the sum of the two sub-products is truncated to fit within the fraction size available in the floating-point format being used, the smaller of the two sub-products will not contribute to the result because it has shifted out beyond the lowest bit of the larger of the two sub-products. For effective subtractions when a larger positive sub-product is added to a much smaller negative sub-product, the larger sub-product would need to be decremented. The decrement is produced by a 31-bit right shift of the smaller sub-product. Therefore, in cases where one of bits 5 to 8 of the shift amount is 1, the fixed 31-bit shift ensures the resulting aligned sub-product will have the correct value taking into account the relative magnitudes of the respective sub-products.

Note that while strictly speaking, only a 24-bit shift would be needed to right shift the smaller sub-product out of the range occupied by the larger sub-product, and also 2 extra bits could be considered to provide for FP32 rounding and account for different positions at which the most significant bit of the product could reside, providing the control logic to constrain for bounds that do not correspond to an exact power of two would increase the critical path latency, as this would require more processing of bits extracted from the shift distance before the control inputs to the shifters could be determined. It can be simpler and faster to apply a 31-bit shift at stage 2, and allow for shifts of up to 31 bits at stage 1, even though for some of the higher shift amounts at stage 1 the aligned sub-product may not end up contributing to the final SPSP outcome anyway.

The most significant bit Sh[9] of the shift amount is used to control a multiplexer 144 provided as the third stage of shifting. This multiplexer selects the output of the multiplexer 145 in the second shift stage 142 if the top bit of the shift amount is 0. If the top bit Sh[9] of the shift amount is 1, the stage 3 multiplexer 144 selects the original unshifted values of the sum and carry terms of the sub-product C×G, which cancels any shifts performed by the first and second shift stages. This is performed because when the upper bit of the shift amount is 1, this indicates that the combined exponents of the sub-products C×G being processed by this shift unit 134 are greater than the combined exponents of the other sub-product, i.e. the sub-product C×G for this shift unit is the larger of the two sub-products and so does not need to be shifted at all. In this case it would be the other shift unit 134 which would be applying a shift to the other sub-product A×E. By speculatively performing the shift using the first and second shift stages 140, 142, but then cancelling the shift if it turns out that the upper bit of the shift amount is 1, this allows the shift to be performed in parallel with the calculation of the upper bit of the shift amount which is the last bit calculated. In contrast, if the shift unit weighted until the upper bit Sh[9] was available before deciding whether to perform the shift, then this would incur extra latency.

The shift unit 134 for shifting the other of the two sub-products is the same as shown in FIG. 8, except for that sub-product, the calculation performed by the carry-save adder 136 in the shift amount calculating circuitry 132 would calculate the two's complement of the operation shown in FIG. 8, i.e. the CSA 136 in the other shift unit it would calculate D+H−B−F instead of B+F−D−H. Otherwise the other shift unit 134 can be the same as the one shown in FIG. 8.

In summary, the shift control includes three stages of sequential shifting. The first stage right shifts the sub-product by between 0 and 31 bits based on the shift distance. The second stage selects either the shifted product or the initial product shifted 31-bits to the right. The third stage can be used to cancel the shift, when the product being shifted is greater than the other. The shift control generation and shift logic are partially overlapped as the lower order shift control bits are available early. Hence, the delay in calculating the shift control is the delay of a 4:2 CSA+10-bit CPA−(delay associated with the portion overlapped with the shifter), and the delay associated with calculating the data to be shifted is "masking delay"+"partial product generation (Booth encoding) delay"+8:2 CSA. For many multipliers the masking may also include the floating-point hidden bit generation. Booth encoding can be approximated to have a delay equivalent to one CSA level.

It will be appreciated that FIG. 8 shows one possible design for the shift control, but there are other ways in which the alignment shift amount could be calculated based on the exponents and used to control alignment of the sub-products.

While the examples discussed above show a multiplier where the sub-product processing circuitry 110 applies a processing function which involves an alignment shift for aligning sub-products based on the exponents of floating-point values subjected to a dot product operation, a similar technique could also be used for other processing functions applied to the sub-products generated by the first CSA stage 120, where the processed sub-products are then reinjected into the third CSA stage 124, and the third CSA stage 124 reuses adders already provided for regular multiplications to perform the addition of the processed sub-products. Hence, it is not essential that the processing function applied by the sub-product processing circuitry is an alignment shift based on floating-point exponents. In general, by providing a re-entrant CSA network 54 designed to provide the early return of sub-products in carry-save form, a function can be applied to the sub-products and the results accumulated within the CSA network itself with little additional hardware.

Figure 9:
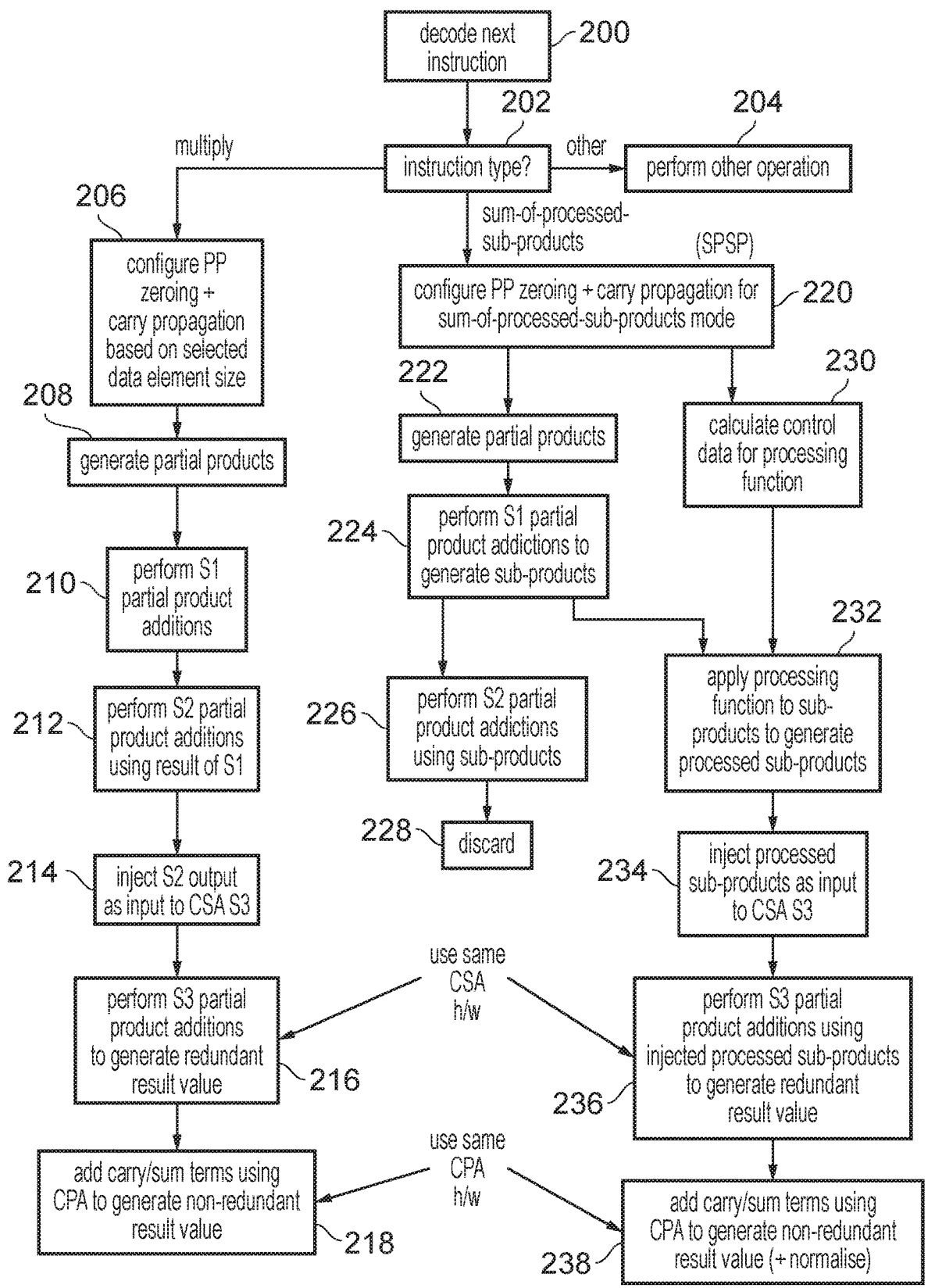
FIG. 9 is a flow diagram showing a method of processing instructions in the multiplication mode or the sum-of-processed-sub-products mode.

FIG. 9 is a flow diagram showing a method of processing multiply or sum-of-processed-sub-products (SPSP) instructions using a multiplier circuit 50 described above. At step 200 the instruction decoder decodes the next instruction, and at step 202 the decoder determines what type of instruction has been decoded and generates control signals for controlling the execute stage 16 to process the instruction according to the decoded instruction type. If the instruction is not a multiply instruction or an SPSP instruction then at step 204 the decoder issues control signals for controlling the execute stage 16 to perform another type of operation.

If the instruction is a multiply instruction then at step 206 the SIMD control circuitry 90 configures the partial product generation circuitry 52 and carry-propagation paths within the CSA network based on a selected data element size indicated for the multiplication operation. For example, portions of partial products may be set to 0 in the regions of the CSA network which do not correspond to the required sub-products of individual SIMD elements within the operands being processed, and carry propagation paths at boundaries between the sub-regions of the CSA network 54 may be controlled to isolate different subregions of the CSA tree to ensure that, rather than generating an overall product of the entire operand width, elements within the operand are individually multiplied to provide a number of independent sub-products.

Based on the configuration applied by the SIMD control circuitry 90, at step 208 the partial product generation circuitry 52 generates partial products from the supplied input operands, e.g. based on a Booth encoding scheme. The partial products are supplied to the CSA tree 54 and at step 210 the first stage 120 of the CSA tree performs a first subset of partial product additions on the partial products, to generate a reduced set of values in carry-save format which include at least those sub-products which would be used if an SPSP instruction was being executed. However, as in this case a multiply instruction is being executed then these sub-products do not necessarily need to be output independently, but may be generated as part of the overall sequence of partial product additions being performed for the multiplication. Depending on the SIMD element size selected, the sub-products which would be calculated for an SPSP instruction may not be identifiable within the outputs of the first CSA stage 120 for a multiply instruction, because there could be carries between respective portions of the CSA network when multiplications at larger element sizes are performed.

At step 212 the second CSA stage 122 takes the result of the first CSA stage 120 and performs further partial product additions using the outputs of the first CSA stage 120, and remaining parts of the partial products which have not yet been input to the first stage. Optionally, although this is the multiply mode, the sub-product processing circuitry may still apply the sub-product processing function to the outputs of the first CSA stage, as it may be simpler in hardware (and incur less latency) if the sub-product processing function is performed speculatively regardless of which mode is selected.

At step 214 the input selection circuitry 112 selects, for input to the third CSA stage 124, the outputs of the second CSA stage 122. Hence, if the sub-product processing circuitry was active even in the multiply mode, its outputs would be discarded by the input selection circuitry 112.

At step 216 the third CSA stage 124 performs further partial product additions based on the inputs from the second stage 122 and remaining portions of the partial products, to reduce the partial products to a redundant result value which comprises a single sum term 70 and a single carry term 72 in carry-save representation. At step 218 the CPA 56 adds the carry and save terms 70, 72 to generate a non-redundant result value, which is a binary value in two's complement form. If the multiplication was performed across the whole operand width (32 bits in the example of FIG. 5) then this non-redundant result value represents the product of the first operand and the second operand. If a SIMD operation with a smaller data element size than the overall operand width is being performed, then the non-redundant result value includes a number of independent result data elements which each represent the product of a corresponding pair of elements within the first and second operands.

If at step 202 the instruction type was determined to be the SPSP instruction then at step 220 the SIMD control circuitry 90 is controlled to configure zeroing of portions of the partial products and carry propagation at locations specific to the SPSP mode. For example, carries may be disabled at certain locations to ensure that the sub-products A×E and C×G are isolated in the outputs of the first CSA stage 120 (without any bits derived from element pairs other than A×E or C×G being added into the sums derived from the element pairs A×E and C×G). Also, the masking logic 128 is controlled to mask out parts of the input vectors which contain the exponents of the floating-point values so as to isolate the fractional parts of the floating-point values in the vectors supplied to the partial products generating stage 52. Also the masking logic may generate the implicit 1 bit of the significand 1.F to be appended to the fractions F. At step 222 the partial product generation circuitry 52 generates the partial products based on the masked values provided and at step 224 the first CSA stage 120 performs a subset of partial product additions to generate the sub-products A×E, C×G. The additions performed at step 224 are the same as the additions performed at step 210 for the multiply instruction (reusing the same hardware adders), except that different (masked) inputs have been provided to the CSAs in the first stage 120 and there may be a different configuration of the locations at which carries are propagated from a CSA in one row/column to a CSA in the next row and next column.

The results of stage 1 are still provided to the second CSA stage 122, and at step 226 the second CSA stage 122 performs further partial products additions using the results of stage 1, but at step 228 these will be discarded because the input control circuitry 112 will select the processed sub-products instead. In some implementations it might be possible to provide some logic to prevent the second CSA stage 122 performing its additions in the case when the SPSP instruction is being executed. However, in practice including such logic may affect the critical path latency for regular multiply instructions and so it may be preferred simply to allow stage 2 to proceed regardless of whether its results will actually be used for the SPSP mode.

Meanwhile, in parallel with the generation of the sub-products at the first CSA stage 120, at step 230 the shift distance calculating circuitry 132 may start calculating the control data for controlling the processing function to be applied by the sub-product processing circuitry 110. In particular this shift distance may be calculated based on the sum/difference of exponents of the various floating-point values being subject to the dot product operation as in the example of FIG. 8. In practice, the calculation of the shift amount proceeds slower than the partial product additions in the first CSA stage 120, because the shift amount calculation uses a carry-propagate add, while the first CSA stage 120 performs carry-save additions.

At step 232 the sub-product processing circuitry 110 applies the processing function (e.g. the alignment shift based on the calculated shift distance) to the generated sub-products to generate processed sub-products. The shift can be performed in multiple stages as shown in FIG. 8, to partially overlap the shift distance calculation with the alignment shift itself, to reduce overall latency. At step 234 the processed sub-products are injected by the input control circuitry 112 as inputs to the third stage 124 of the carry save adder network 54. At step 236, the third CSA stage 124 performs further partial product additions using the injected process sub-products to generate the redundant result value. Step 236 is performed using the same adder hardware circuits as step 216 which uses these circuits for the multiply operation. At step 238, the carry and sum terms 72, 70 of the redundant result are then added using the carry propagate adder 56 to generate a non-redundant result value. Again, step 238 uses the same hardware circuits in the CPA 56 as step 218. Note that while FIG. 9 shows in particular that the steps 216/236 use the same hardware circuits, and steps 218/238 use the same hardware circuits, this is not intended to imply that other steps must necessarily use unique hardware for the multiply and SPSP modes. Some of the other steps (e.g. partial product generation at steps 208, 222 and 51 partial product additions at steps 208, 222) could also use the same hardware circuits for both multiply and SPSP modes.

In the case where the processing function applied at step 232 is the alignment of processed sub-products based on exponents of corresponding floating-point values, then at step 238 an additional normalisation operation may be provided to apply a shift to the output of the CPA 56 so as to align the most significant non-zero bit with the upper end of the significand, the implicit 1 bit may be removed, and the product fraction truncated to generate the fraction for a normalised floating-point value having the specified number of bits required for the particular floating-point format being used (e.g. for bfloat16 the fraction may be truncated to form a 7-bit value which corresponds to the trailing bits T of the fraction). Rounding may be applied depending on the floating-point rounding mode to be used. This normalisation/rounding may not be performed in step 218 for the multiply operation.

In summary, a SIMD multiplier is re-used for bfloat16 dot product operations. The multiplier provides for early return of sub-products in a redundant form, with an alignment shift performed in the shadow of reduction of unused rows of the CPA network, and the aligned products in redundant form re-enter the reduction network to use the full adder with little effect on the critical path.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A multiplier circuit comprising:
a carry-save adder (CSA) network comprising a plurality of carry-save adders to perform partial product additions to reduce a plurality of partial products to a redundant result value represented using a carry-save representation, the CSA network comprising:
   a first stage of carry-save adders to perform a first subset of the partial product additions using selected portions of the partial products to generate a plurality of sub-products; and
   at least one further stage of carry-save adders to perform a further subset of the partial product additions using the plurality of sub-products generated by the first stage and remaining portions of the partial products, to generate the redundant result value;
sub-product processing circuitry to apply a processing function to the plurality of sub-products generated by the first stage of carry-save adders, to generate processed sub-products represented using the carry-save representation, said processing function comprising at least one operation other than addition; and
input control circuitry to inject the processed sub-products as inputs to a subset of carry-save adders of said at least one further stage, to provide a sum-of-processed-sub-products mode in which the redundant result value generated by said at least one further stage represents a sum of the processed sub-products generated by the sub-product processing circuitry.

2. The multiplier circuit according to claim 1, in which the input control circuitry is configured to inject, as inputs to said subset of carry-save adders of said at least one further stage:
in said sum-of-processed-sub-products mode, the processed sub-products generated by the sub-product processing circuitry; and
in a multiplication mode, inputs depending on at least one of:
the sub-products generated by the first stage of carry-save adders;
results of earlier carry-save adders of said at least one further stage; and
said remaining portions of the partial products.

3. The multiplier circuit according to claim 2, in which the multiplier circuit is configured to use the same hardware circuits of said subset of carry-save adders both for:
said further subset of the partial product additions for generating said redundant result value in the multiplication mode; and
addition of the processed sub-products in the sum-of-processed-sub-products mode.

4. The multiplier circuit according to claim 2, in which in the multiplication mode, the redundant result value comprises one or more elements each representing a product of a respective pair of elements of a first operand and a second operand.

5. The multiplier circuit according to claim 4, comprising SIMD control circuitry to control, based on a selected data element size of said one or more elements of the first operand and second operand, at least one of:
zeroing of portions of the partial products; and
propagation of carries between respective carry-save adders of the CSA network.

6. A data processing apparatus comprising:
the multiplier circuit according to claim 2; and
an instruction decoder to decode a program instruction to generate control signals to control the multiplier circuit; in which:
in response to a multiply instruction, the instruction decoder is configured to generate control signals to control the input control circuitry to operate in the multiplication mode; and
in response to a sum-of-processed-sub-products instruction, the instruction decoder is configured to generate control signals to control the input control circuitry to operate in the sum-of-processed-sub-products mode.

7. The multiplier circuit according to claim 1, in which said at least one further stage of carry-save adders comprises second and third stages of carry-save adders to perform second and third subsets of the partial product additions, where in a multiplication mode the third stage is configured to perform the third subset of the partial product additions dependent on results of said second subset of partial product additions performed by the second stage; and
said subset of carry-save adders are in said third stage of carry-save adders.

8. The multiplier circuit according to claim 7, in which the second stage of carry-save adders is configured to perform the second subset of the partial product additions in parallel with the sub-product processing circuitry applying said processing function to the plurality of sub-products.

9. The multiplier circuit according to claim 1, in which the at least one further stage of carry-save adders comprises a plurality of lanes of carry-save adders, each lane of carry-save adders to generate bit values of a corresponding part of the redundant result value; and
said subset of carry-save adders are provided in a most significant subset of said plurality of lanes of carry-save adders, said most significant subset excluding at least one lane of carry-save adders for generating a least significant part of the redundant result value.

10. The multiplier circuit according to claim 1, comprising a carry-propagate adder to add a sum term and a carry term of the redundant result value to generate a non-redundant result value represented in a non-redundant representation.

11. The multiplier circuit according to claim 1, comprising partial product generating circuitry to generate the plurality of partial products based on a first operand and a second operand; in which
each of the plurality of sub-products corresponds to a product of a respective pair of selected portions of the first and second operands.

12. The multiplier circuit according to claim 1, in which the processing function comprises an alignment shift to align the plurality of sub-products.

13. The multiplier circuit according to claim 12, in which the sub-product processing circuitry comprises:
shift amount calculating circuitry to calculate a shift amount based on further portions of the first and second operands; and
shift circuitry to shift a given sub-product of the plurality of sub-products by a number of bit positions depending on the shift amount calculated by the shift amount calculating circuitry.

14. The multiplier circuit according to claim 13, in which said partial product generating circuitry is configured to select:
as said selected portions, portions of the first and second operands representing fractions of a plurality of floating-point values represented in a floating-point representation; and
as said further portions, portions of the first and second operands representing exponents of said plurality of floating-point values.

15. The multiplier circuit according to claim 14, in which said floating-point representation is a truncated-precision floating-point representation having the same number of exponent bits as a full-precision floating-point representation and a smaller number of fraction bits than the full-precision floating-point representation.

16. The multiplier circuit according to claim 13, in which the shift circuitry comprises a plurality of shift stages including at least:
a first shift stage to perform a stage one shift operation on the given sub-product depending on a least significant portion of the shift amount calculated by the shift amount calculating circuitry; and
a second shift stage to perform a stage two shift operation on the given sub-product or a result of the first shift stage, depending on a more significant portion of the shift amount calculated by the shift amount calculating circuitry; and
the first shift stage is configured to perform the stage one shift operation in parallel with the shift amount calculating circuitry calculating said more significant portion of the shift amount.

17. The multiplier circuit according to claim 13, in which the shift amount calculating circuitry is configured to calculate a most significant portion of the shift amount in parallel with the shift circuitry performing the shift on the given sub-product based on at least one less significant portion of the shift amount; and
the sub-product processing circuitry is configured to select based on the most significant portion of the shift amount whether to cancel the shift performed on the given sub-product by the shift circuitry.

18. A data processing apparatus comprising the multiplier circuit according to claim 1.

19. A multiplier circuit comprising:
means for carry-save adding, comprising a plurality of carry-save adders to perform partial product additions to reduce a plurality of partial products to a redundant result value represented using a carry-save representation, the means for carry-save adding comprising:
a first stage of carry-save adders to perform a first subset of the partial product additions using selected portions of the partial products to generate a plurality of sub-products; and
at least one further stage of carry-save adders to perform a further subset of the partial product additions using the plurality of sub-products generated by the first stage and remaining portions of the partial products, to generate the redundant result value;
means for applying a processing function to the plurality of sub-products generated by the first stage of carry-save adders, to generate processed sub-products represented using the carry-save representation, said processing function comprising at least one operation other than addition; and
means for injecting the processed sub-products as inputs to a subset of carry-save adders of said at least one further stage, to provide a sum-of-processed-sub-products mode in which the redundant result value generated by said at least one further stage represents a sum of the processed sub-products generated by said means for applying the processing function.

20. A method for a multiplier circuit comprising a carry-save adder (CSA) network comprising a plurality of carry-save adders to perform partial product additions to reduce a plurality of partial products to a redundant result value represented using a carry-save representation, the CSA network comprising: a first stage of carry-save adders to perform a first subset of the partial product additions using selected portions of the partial products to generate a plurality of sub-products; and at least one further stage of carry-save adders to perform a further subset of the partial product additions using the plurality of sub-products generated by the first stage and remaining portions of the partial products, to generate the redundant result value;
the method comprising:
controlling the first stage of carry-save adders to perform the first subset of the partial product additions;
controlling sub-product processing circuitry to apply a processing function to the plurality of sub-products generated by the first stage of carry-save adders, to generate processed sub-products represented using the carry-save representation, said processing function comprising at least one operation other than addition; and
injecting the processed sub-products as inputs to a subset of carry-save adders of said at least one further stage, to provide a sum-of-processed-sub-products mode in which the redundant result value generated by said at least one further stage represents a sum of the processed sub-products generated by the sub-product processing circuitry.

* * * * *